United States Patent
Tsuboi et al.

(10) Patent No.: US 9,879,718 B2
(45) Date of Patent: Jan. 30, 2018

(54) SLIDING BEARING AND METHOD FOR MANUFACTURING SLIDING BEARING

(71) Applicant: TAIHO KOGYO Co., Ltd., Toyota-shi, Aichi (JP)

(72) Inventors: Yoichiro Tsuboi, Toyota (JP); Koichi Yatsuda, Toyota (JP); Atsushi Ueyama, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 0 days.

(21) Appl. No.: 15/326,267

(22) PCT Filed: May 24, 2016

(86) PCT No.: PCT/JP2016/065307
§ 371 (c)(1),
(2) Date: Jan. 13, 2017

(87) PCT Pub. No.: WO2016/203913
PCT Pub. Date: Dec. 22, 2016

(65) Prior Publication Data
US 2017/0219008 A1    Aug. 3, 2017

(30) Foreign Application Priority Data
Jun. 19, 2015 (JP) .................. 2015-123786

(51) Int. Cl.
*F16C 17/10*    (2006.01)
*F16C 33/14*    (2006.01)
(Continued)

(52) U.S. Cl.
CPC ............... *F16C 17/10* (2013.01); *F16C 9/02* (2013.01); *F16C 33/046* (2013.01); *F16C 33/14* (2013.01)

(58) Field of Classification Search
CPC ........... F16C 17/10; F16C 33/046; F16C 9/02
See application file for complete search history.

(56) References Cited

U.S. PATENT DOCUMENTS 3,972,576 A * 8/1976 Hill .................. F16C 17/10
384/276
4,989,998 A * 2/1991 Willis ................ F16C 17/10
384/275
(Continued)

FOREIGN PATENT DOCUMENTS

JP    07-502327 A    3/1995
JP    2008-510107 A    4/2008
(Continued)

OTHER PUBLICATIONS

Extended European Search Report for corresponding application No. 16811388.4, dated Sep. 11, 2017 (6 pages).

*Primary Examiner* — Thomas R Hannon
(74) *Attorney, Agent, or Firm* — Flynn, Thiel, Boutell & Tanis, P.C.

(57) ABSTRACT

Bearing 10 includes: a half bearing member having an inner circumferential face that slides against an associated shaft, and a plurality of recesses provided in a first end face in an axial direction of the associated shaft; a first flange member having a plurality of projections provided at positions corresponding to the plurality of recesses provided in the first end face; and a plurality of staking marks formed in a periphery of each recess when each recess is staked in a state where each of the plurality of projections is fitted to a corresponding one of the plurality of recesses in the first end face to fix the first flange member to the half bearing member. When staking marks formed on both sides of at least one of the plurality of recesses are viewed in a radial direction of the associated shaft, a volume of a deformed portion near a staking mark located outside in a circumfer- (Continued)

ential direction is smaller than a volume of a deformed portion close to a staking mark located inside.

8 Claims, 11 Drawing Sheets

(51) Int. Cl.
*F16C 33/04* (2006.01)
*F16C 9/02* (2006.01)

(56) References Cited

U.S. PATENT DOCUMENTS

| | | | | |
|---|---|---|---|---|
| 5,145,264 | A * | 9/1992 | Bryden | F16C 17/10 384/275 |
| 2003/0128902 | A1 * | 7/2003 | Kennedy | F16C 9/02 384/275 |
| 2014/0177987 | A1 * | 6/2014 | Roberto | F16C 17/10 384/275 |

FOREIGN PATENT DOCUMENTS

| | | |
|---|---|---|
| JP | 2014-122660 A | 7/2014 |
| JP | 2015-110979 A | 6/2015 |
| JP | 2015-200381 A | 11/2015 |

* cited by examiner

SLIDING BEARING AND METHOD FOR MANUFACTURING SLIDING BEARING

TECHNICAL FIELD

The present invention relates to a technique for achieving both ease of assembly and dimensional accuracy of a flanged bearing.

BACKGROUND ART

Use of a half bearing and a flanged sliding bearing in a crankshaft in an automobile engine or the like is known. By this configuration, the half bearing receives a load in a direction perpendicular to an axial direction of an associated shaft, and the flange receives a load in the axial direction. For example, Patent Document 1 describes a thrust bearing assembly having a main bearing (corresponding to the half bearing) and a thrust washer (corresponding to the flange).

CITATION LIST

Patent Document

Patent Document 1: JP 2008-510107A

SUMMARY OF INVENTION

Technical Problem

In the technique described in Patent Document 1, the half bearing and the flange are not fixed to each other before assembly, which causes inconvenience during an assembly operation. However, if the half bearing and the flange are simply joined to each other, there is a concern that the dimensions of a free spread or the like of the half bearing will deviate from intended values thereof.

In view of this, the present invention provides a technique for achieving both ease of assembly and dimensional accuracy of a flanged bearing.

Solution to Problem

The present invention provides a sliding bearing including: a half bearing member having an inner circumferential face that slides against an associated shaft, and a plurality of recesses provided in a first end face in an axial direction of the associated shaft; a first flange member having a plurality of projections provided at positions corresponding to the plurality of recesses provided in the first end face; and a plurality of staking marks formed in a periphery of each recess when each recess is staked in a state where each of the plurality of projections is fitted to a corresponding one of the plurality of recesses in the first end face to fix the first flange member to the half bearing member, wherein, regarding staking marks formed on both sides of at least one of the plurality of recesses, when viewed in a radial direction of the associated shaft, a volume of a deformed portion near a staking mark located outside in a circumferential direction is smaller than a volume of a deformed portion close to a staking mark located inside.

When staking marks formed on both sides of each of two recesses, from among the plurality of recesses, located in outermost parts in the circumferential direction are viewed in the radial direction, an angle of a staking mark located outside in the circumferential direction may be smaller than an angle of a staking mark located inside.

When staking marks formed on both sides of each of two recesses, from among the plurality of recesses, located in outermost parts in the circumferential direction are viewed in the radial direction, a distance between a staking mark located outside in the circumferential direction and a corresponding recess may be longer than a distance between a staking mark located inside and the recess.

The plurality of staking marks may have the same depth when viewed in the axial direction.

When staking marks formed on both sides of each of two recesses, from among the plurality of recesses, located in outermost parts in the circumferential direction are viewed in the radial direction, a depth of a staking mark located outside in the circumferential direction may be shallower than a depth of a staking mark located inside.

The plurality of staking marks may have the same angle when viewed in the axial direction.

This sliding bearing may further include: a plurality of recesses provided in a second end face of the half bearing member in the axial direction; a second flange member having a plurality of projections provided at positions corresponding to the plurality of recesses provided in the second end face; and a plurality of staking marks formed in a periphery of each recess when each recess is staked in a state where each of the plurality of projections is fitted to a corresponding one of the plurality of recesses in the second end face to fix the second flange member to the half bearing member, wherein, in each of the first end face and the second end face, regarding staking marks formed on both sides of at least one of the plurality of recesses, when viewed in the radial direction, a volume of a deformed portion close to a staking mark located outside in the circumferential direction may be smaller than a volume of a deformed portion close to a staking mark located inside.

The present invention also provides a method for manufacturing a sliding bearing including: a process of preparing a half bearing member having an inner circumferential face that slides against an associated shaft, and a plurality of recesses provided in a first end face in an axial direction of the associated shaft; a process of preparing a first flange member having a plurality of projections provided at positions corresponding to the plurality of recesses provided in the first end face; a process of preparing two punches arranged with a spacing wider than a width of the recess; and a process of, in a state where each of the plurality of projections is fitted to a corresponding one of the plurality of recesses in the first end face, staking at least one of the plurality of recesses such that a volume of a deformed portion close to a staking mark located outside in a circumferential direction of the associated shaft is smaller than a volume of a deformed portion close to a staking mark located inside, and fixing the first flange member to the half bearing member.

Effects of Invention

According to the present invention, both ease of assembly and dimensional accuracy of a flanged bearing can be achieved.

REFERENCE SIGNS LIST

Figure 1:
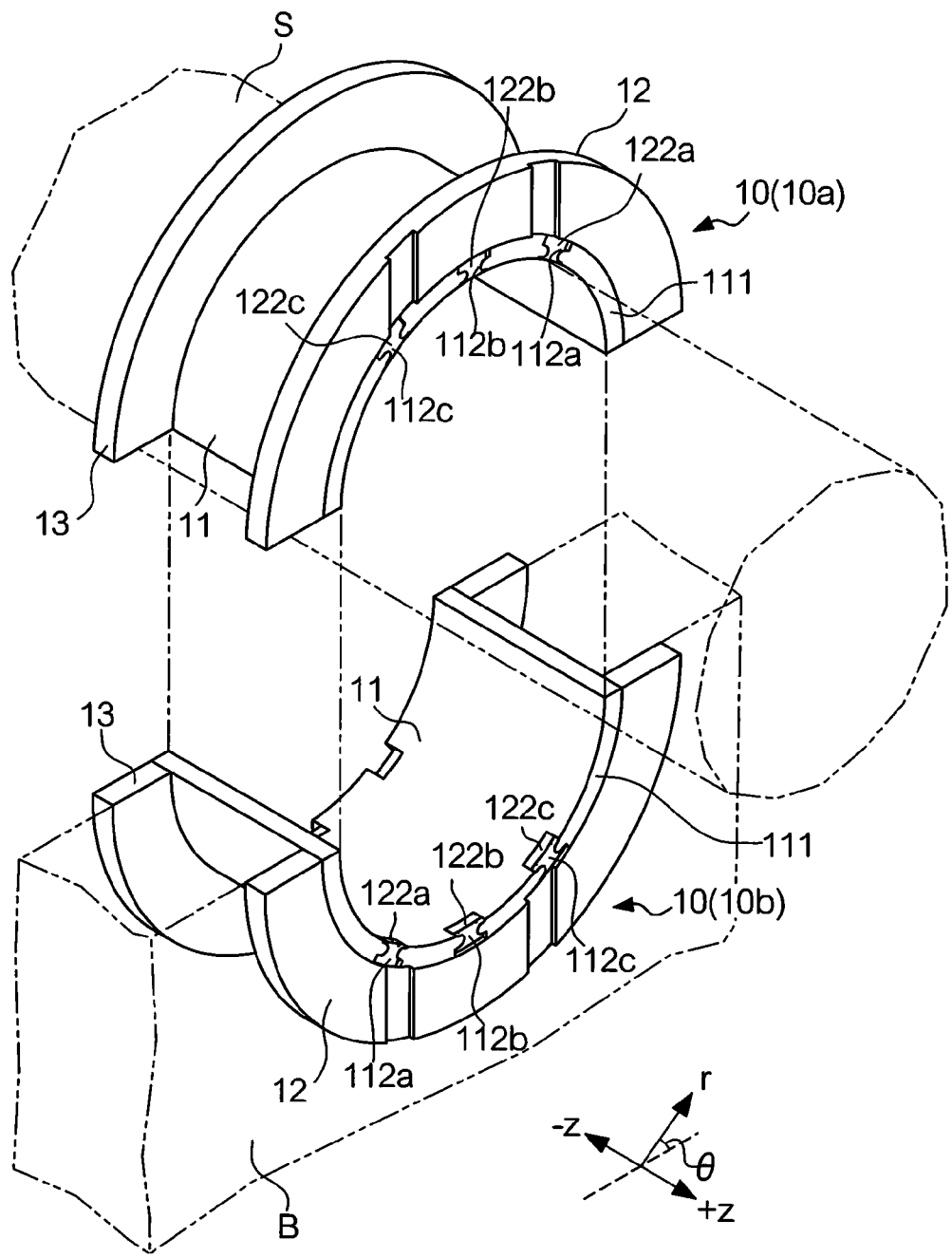
FIG. 1 is a diagram showing exemplary bearing 10 according to an embodiment.

10 Bearing
11 Half bearing member
12 Flange member
13 Flange member
21 Punch
22 Punch
23 Punch
111 Side face
112 Recess
113 Side face
114 Recess
115 Parting line
116 Parting line
117 Inner circumferential face
118 Overlay layer
119 Back face
121 Inner circumferential face
122 Projection
123 Parting line
124 Parting line
125 Thrust face
126 Lubrication groove
211 Punching portion
212 Punching portion
213 Beam
221 Punching portion
222 Punching portion
231 Punching portion
232 Punching portion

DESCRIPTION OF EMBODIMENTS

1. Configuration

FIG. 1 is a diagram showing exemplary bearing 10 according to an embodiment. Bearing 10 is a flange assembly (an example of a sliding bearing) for supporting crankshaft S in cylinder block B (an example of a housing) in an automobile engine, for example. Crankshaft S is a cylindrical shaft and rotates relative to bearing 10. Crankshaft S is an example of an associated shaft that is associated with bearing 10.

Bearing 10 has half bearing member 11, flange member 12 (an example of a first flange member), and flange member 13 (an example of a second flange member). Half bearing member 11 has a semi-cylindrical shape obtained by halving a cylinder in the axial direction. An inner circumferential face of half bearing member 11 slides against an outer circumferential face of crankshaft S. Half bearing member 11 is a main bearing that receives a load perpendicular to the axial direction. Flange member 12 and flange member 13 extend in a radial direction of the shaft from ends of half bearing member 11 in the axial direction. Flange member 12 and flange member 13 are thrust bearings (thrust washers) for receiving a load (thrust load) in the axial direction via cylinder block B (housing).

Bearing 10 supports half of the outer circumference of crankshaft S in a cross-section thereof perpendicular to the axial direction. That is to say, two bearings 10 are used at one portion to support the entire circumference of crankshaft S. In an example shown in FIG. 1, two bearings, namely bearing 10a and bearing 10b are used. Note that bearing 10a and bearing 10b do not necessarily need to be used as a pair, and only one of them may be used. In the case that these bearings are used as a pair, either bearing 10a or bearing 10b may not necessarily have a flange member, and the flange member may be provided in only one of the bearings, or at one end of both bearings. Furthermore, a later-described overlay layer may be provided in only one of bearing 10a and bearing 10b, or in both of them.

A coordinate system is defined for ease of understanding of the following description. In this coordinate system, the axial direction of the associated shaft is a z direction, and a position in the circumferential direction and the radial direction of the shaft is expressed as a polar coordinate system $(r, \theta)$. $\theta$ denotes a displacement angle from a reference plane (e.g. a horizontal plane), and r denotes a distance from a reference point (e.g. the center of the associated shaft).

Half bearing member 11 has a multi-layer structure in which a back metal, a lining layer, and an overlay layer (which are not shown in the diagram), are stacked in the radial direction of the associated shaft, for example. The back metal is a layer that gives half bearing member 11 mechanical strength. The back metal is made of steel, for example. The lining layer is a layer for improving bearing properties, e.g. frictional properties, seizure resistance, wear resistance, conformability, foreign particle embedding properties (robustness against foreign particle), corrosion resistance, and the like. The lining layer is made of a bearing alloy. To prevent adhesion to the shaft, a type of material different from the material of the shaft is used as the bearing alloy in order to avoid high friction that occurs between the shaft and a material having a similar composition. For example, if crankshaft S is made of steel, an alloy of materials other than steel, such as an aluminum alloy, is used as the bearing alloy. Note that, in addition to an aluminum alloy, an alloy using a metal other than aluminum as a base, such as a copper alloy, may be used. The overlay layer is formed with a resin coating or metal plating as a coating layer for improving the properties of the lining layer, such as a friction coefficient, conformability, corrosion resistance, foreign particle embedding properties (robustness against foreign particle), and the like.

Flange member 12 and flange member 13 are made of a material similar to that of half bearing member 11. However, flange member 12 and flange member 13 are manufactured separately from half bearing member 11, and are thereafter fixed to half bearing member 11. Therefore, flange member 12 and flange member 13 may be made of a material different from that of half bearing member 11, or may be formed to have a different thickness.

For fixation between half bearing member 11 and flange member 12, recesses 112 are formed in end face 111 of half bearing member 11 on one end side in the axial direction, and projections 122 are formed in inner circumferential face 121 of flange member 12 on the inside thereof in the radial direction. Here, end face 111 (an example of a first end face) is a face whose normal line is oriented in the +z-axial direction. Half bearing member 11 also has an end face (an example of a second end face) on the side opposite to end face 111 (a portion that is hidden in FIG. 1), and recesses are also formed in this end face. In this example, three recesses 112 and three projections 122 (recesses 112a to 112c and projections 122a to 122c) are formed. Recess 112a and projection 122a, recess 112b and projection 122b, and recess 112c and projection 122c are respectively fitted to each other. Note that the width of each recess 112 is formed to be wider than the width of each projection 122.

Flange member 12 is fixed to half bearing member 11 by staking regions close to each recess 112, in a state where each recess 112 is fitted to corresponding projection 122. Here, "staking" refers to joining target parts by applying pressure thereto using a specific component. Thus, half bearing member 11 and flange member 12 are fixed to and integrated with each other when assembled to cylinder block B. By use of bearing 10 according to this embodiment, the man-hours for assembly to cylinder block B can be reduced, and the possibility of erroneous assembly with regard to the orientation of flange member 12 can also be reduced, compared with the case of assembling, to cylinder block B, half bearing member 11 and flange member 12 in a state that they are not fixed to each other. Note that, although description thereof is omitted herein, the fixation between flange member 13 and half bearing member 11 is similar to the fixation between flange member 12 and half bearing member 11.

Note that the fixation between half bearing member 11 and flange member 12 needs to be maintained at least only while bearing 10 is assembled to cylinder block B. After assembly, the fixation state may not necessarily be maintained when the engine is driven. The staking of flange member 12 may be released as a result of receiving a load in the axial direction. In this case, when the engine operates, flange member 12 moves in accordance with the load, comes into contact with cylinder block B, and receives a load.

2. Manufacturing Method

Figure 2:
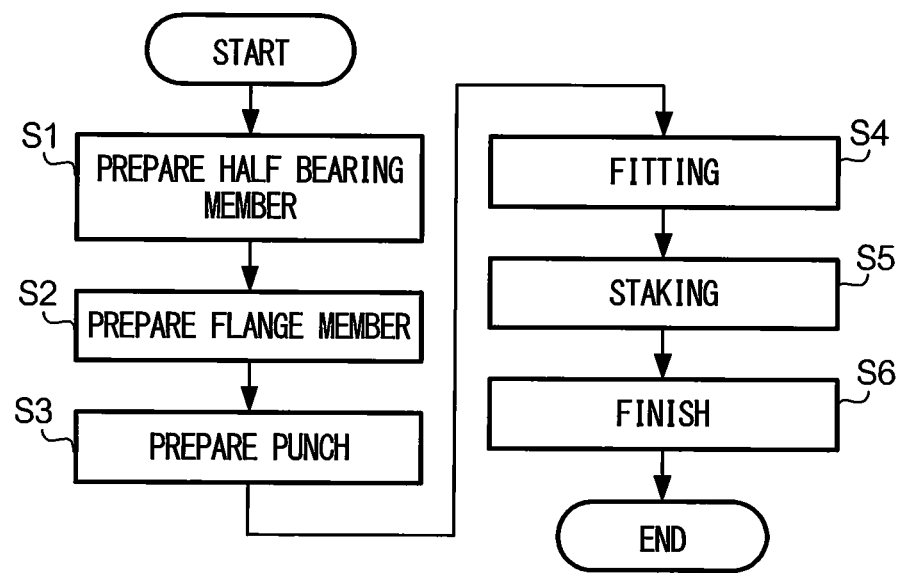
FIG. 2 is a flowchart of an exemplary method for manufacturing bearing 10 according to an embodiment.

FIG. 2 is a flowchart of an exemplary method for manufacturing bearing 10 according to an embodiment.

In process S1, half bearing member 11 is prepared.

Figure 3:
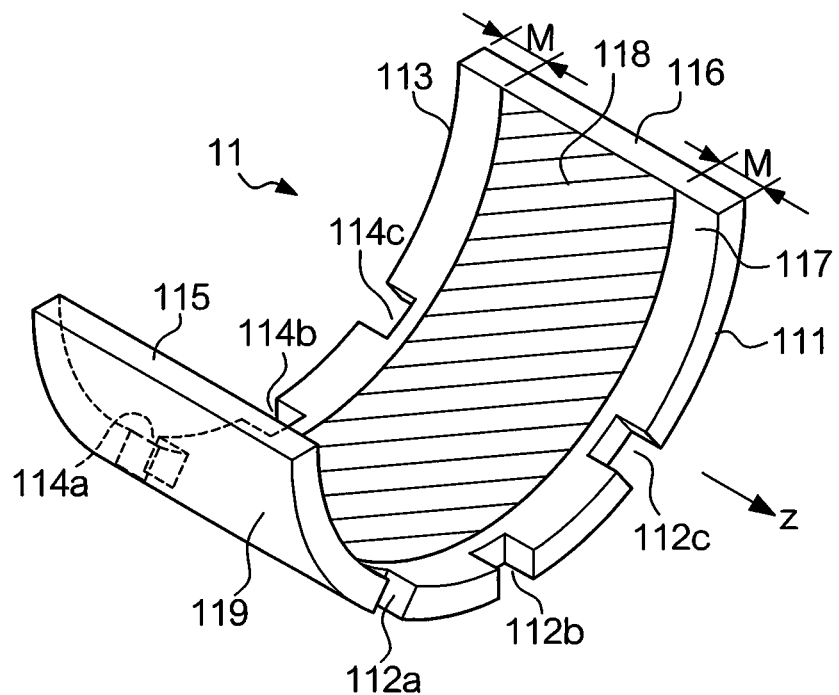
FIG. 3 is a diagram showing an exemplary external appearance of half bearing member 11.

FIG. 3 is a diagram showing an exemplary external appearance of half bearing member 11. A method for manufacturing half bearing member 11 is as follows, for example. Initially, the bearing alloy that is to serve as the lining layer is, for example, pressure-welded onto a plate-shaped back metal to obtain a bimetal. This plate-shaped base material is cut into short strips (small pieces) collectively having a size corresponding to half bearing member 11, and these strips are formed into a semi-cylindrical shape. Thereafter, portions corresponding to both end sides in the axial direction are cut off at a certain width. Thereafter, the recesses that pass through from the top to the bottom of half bearing member 11 are formed, and the overlay layer is formed over the bimetal according to the required properties. The height of these recess forming portions is lower than that of a sliding face of half bearing member 11.

Half bearing member 11 has overlay layer 118 on a part of inner circumferential face 117. Overlay layer 118 extends in the circumferential direction of the associated shaft. Front faces at both ends of overlay layer 118 in the axial direction are machined, and the lining layer or the back metal is exposed. Recesses 112 and recesses 114 are formed in the part where the lining layer or the back metal is exposed. In this example, recesses 112 are formed in face 111 that is one end face of half bearing member 11 in the axial direction, and pass through from inner circumferential face 117 to outer circumferential face 119. The same applies to recesses 114. Note that recesses 112 and recesses 114 may not pass through up to inner circumferential face 117.

Figure 4:
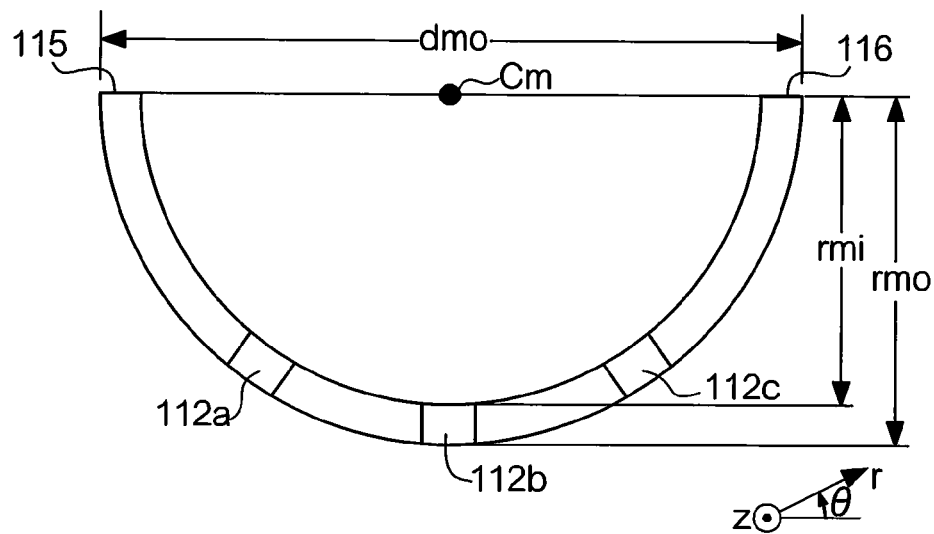
FIG. 4 is an external view of half bearing member 11 when viewed in an axial direction.

FIG. 4 is an external view of half bearing member 11 when viewed in the axial direction. Recess 112b is formed in a central part of the inner circumference of half bearing member 11. Recess 112a is formed on the −θ side when viewed from recess 112b, and recess 112c is formed on the +θ side when viewed from recess 112b. The distance from recess 112b to recess 112a is equal to the distance from recess 112b to recess 112c.

Half bearing member 11 has parting line 115 and parting line 116 that come into contact with another bearing 10. Considering midpoint Cm of a line connecting parting line 115 to parting line 116 to be an imaginary central point, distance rmi from midpoint Cm to the sliding face is referred to as an "inner radius," and distance rmo to the outer circumferential face (back face) is referred to as an "outer radius." In half bearing member 11, the outer radius is not strictly uniform. Outer diameter dmo on the parting lines is larger than imaginary outer diameter 2rmo of the central part. That is to say, the outer circumferential face of half bearing member 11 is not a mathematically accurate arc. The same applies to the inner radius. At this time, outer diameter dmo is referred to as a "free spread." With some free spread, tensile force from the inside to the outside of half bearing member 11 is exerted on cylinder block B, and the effect of suppressing bearing 10 being detached from cylinder block B is obtained. The amount of free spread is designed in accordance with the dimensions of the bearing.

Refer to FIG. 2 again. In process S2, flange member 12 and flange member 13 are prepared. In this example, only flange member 12 will be described, since flange member 12 and flange member 13 have an identical shape.

Figure 5:
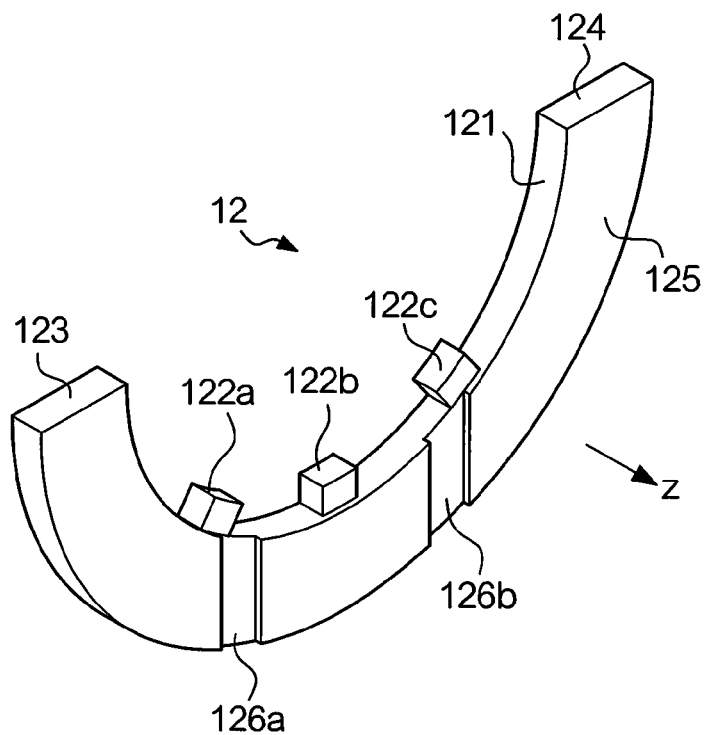
FIG. 5 is a diagram showing an exemplary external appearance of flange member 12.

FIG. 5 is a diagram showing an exemplary external appearance of flange member 12.

A method for manufacturing flange member 12 is as follows, for example. Initially, a plate-shaped bimetal is formed, similar to half bearing member 11. A shape corresponding to flange member 12 is cut out from this plate-shaped base material. Furthermore, an overlay layer is formed according to the required properties, if necessary.

Flange member 12 has thrust face 125 for receiving a thrust load, and inner circumferential face 121 that comes into contact with half bearing member 11. Lubrication grooves 126 are formed in thrust face 125. In this example, two lubrication grooves, namely lubrication groove 126a and lubrication groove 126b are formed. Lubrication grooves 126 are grooves for holding lubricating oil and also serving as an oil supply route for receiving a supply of the lubricating oil from half bearing member 11. Projections 122 are formed in inner circumferential face 121.

Figure 6:
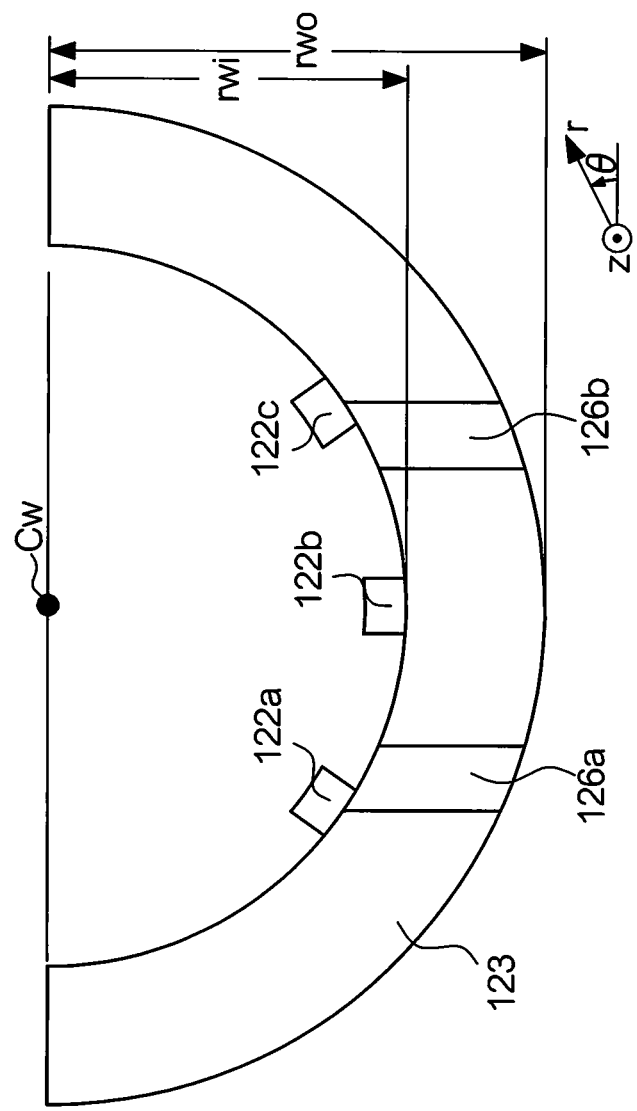
FIG. 6 is an external view of flange member 12 when viewed in the axial direction.

FIG. 6 is an external view of flange member 12 when viewed in the axial direction. Projection 122b is formed in a central part of the inner circumference of flange member 12. Projection 122a is formed on the −θ side when viewed from projection 122b, and projection 122c is formed on the +θ side when viewed from projection 122b. The distance from projection 122b to projection 122a is equal to the distance from projection 122b to projection 122c. Projections 122a to 122c are formed at positions such that they can be fitted to recesses 112a to 112c in half bearing member 11.

Flange member 12 has parting line 123 and parting line 124 that correspond respectively to parting line 115 and parting line 116 of half bearing member 11. Considering midpoint Cw of a line connecting parting line 123 and parting line 124 to be an imaginary central point, distance rwi from midpoint Cw to the inner circumferential face is referred to as an "inner radius," and distance rwo to the outer circumferential face is referred to as an "outer radius." The inner radius of flange member 12 is substantially equal to the outer radius of half bearing member 11.

Refer to FIG. 2 again. In process S3, a punch (tool) to be used for staking is prepared.

Figure 7:
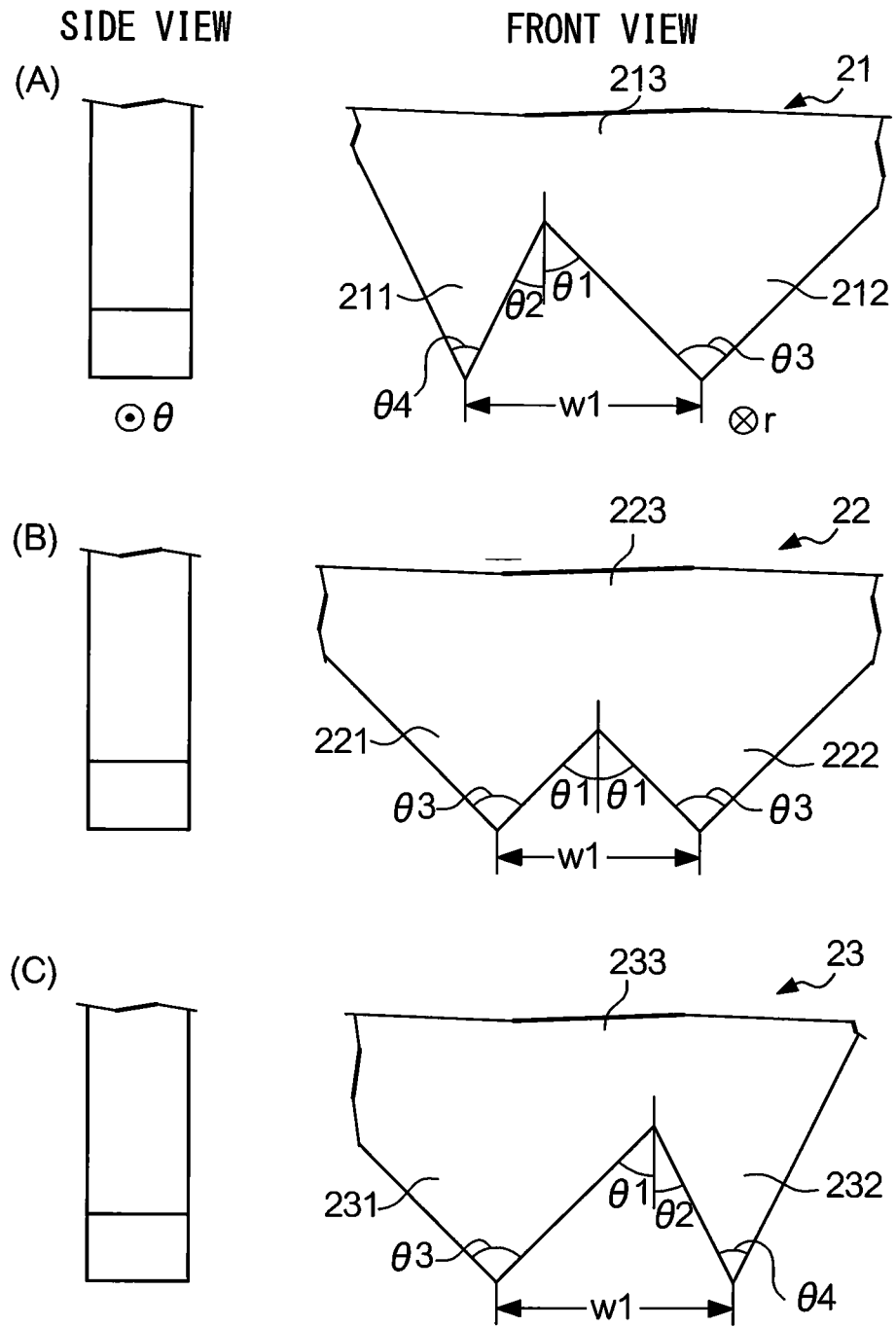
FIG. 7 shows exemplary punches used in this embodiment.

FIG. 7 shows exemplary punches used in this embodiment. In this example, three punches, namely, punch 21, punch 22, and punch 23 are used. Punch 21 is used for staking recess 112a and projection 122a. Punch 22 is used for staking recess 112b and projection 122b. Punch 23 is used for staking recess 112c and projection 122c. FIG. 7 shows these punches when viewed in a direction corresponding to the radial direction when in use (front view) and when viewed in the circumferential direction (side views).

Punch 22 has punching portion 221 and punching portion 222. Punching portion 221 and punching portion 222 are machining tools for subjecting an object (a region close to each recess 112 in half bearing member 11) to plastic deformation. Tips of punching portion 221 and punching portion 222 have a pointed shape when viewed in the radial direction (i.e. from midpoint Cw or the axial center). The angles of inner faces of punching portions 221 and 222 relative to the moving direction of the punching portions (a downward direction in the diagram) when in use are both θ1. The angles of tips of punching portion 221 and punching portion 222 are the same, i.e. θ3. Distance W1 between the tip of punching portion 211 and the tip of punching portion 212 is wider than the width of each recess 112. With punch 22, both sides of each recess 112 can be staked with the same force.

Punch 21 has punching portion 211 and punching portion 212. The angle of an inner face of punching portion 212 relative to the moving direction of the punching portion when in use is θ1, and the angle of an inner face of the punching portion 211 is θ2 (here, θ2<θ1). The angle of a tip of punching portion 212 is θ3, which is the same as angle θ3 of the tips of punching portion 221 and punching portion 222. The angle of a tip of punching portion 211 is θ4 (here, θ4<θ3). With punch 21, the volume of a portion to be subjected to plastic working by punching portion 211 is smaller than the volume of a portion to be subjected to plastic working by punching portion 212. That is to say, with punch 21, the two sides of each recess 112 can be staked with different forces.

Punch 23 has punching portion 231 and punching portion 232. The angle of an inner face of punching portion 231 relative to the moving direction of the punching portion when in use is θ1, and the angle of an inner face of the punching portion 232 is θ2. The angle of a tip of punching portion 231 is θ3, which is the same as angle θ3 of the tips of punching portion 221 and punching portion 222. The angle of a tip of punching portion 232 is θ4, which is the same as the angle of the tip of punching portion 211. With punch 23, the volume of a part to be subjected to plastic working by punching portion 232 is smaller than the volume of a part to be subjected to plastic working by punching portion 231. That is to say, with punch 23, the two sides of each recess 112 can be staked with different forces.

Refer to FIG. 2 again. In process S4, recesses 112 in half bearing member 11 and projections 122 in flange member 12 are fitted to each other. In process S5, regions close to each recess 112 in half bearing member 11 are staked.

Figure 8:
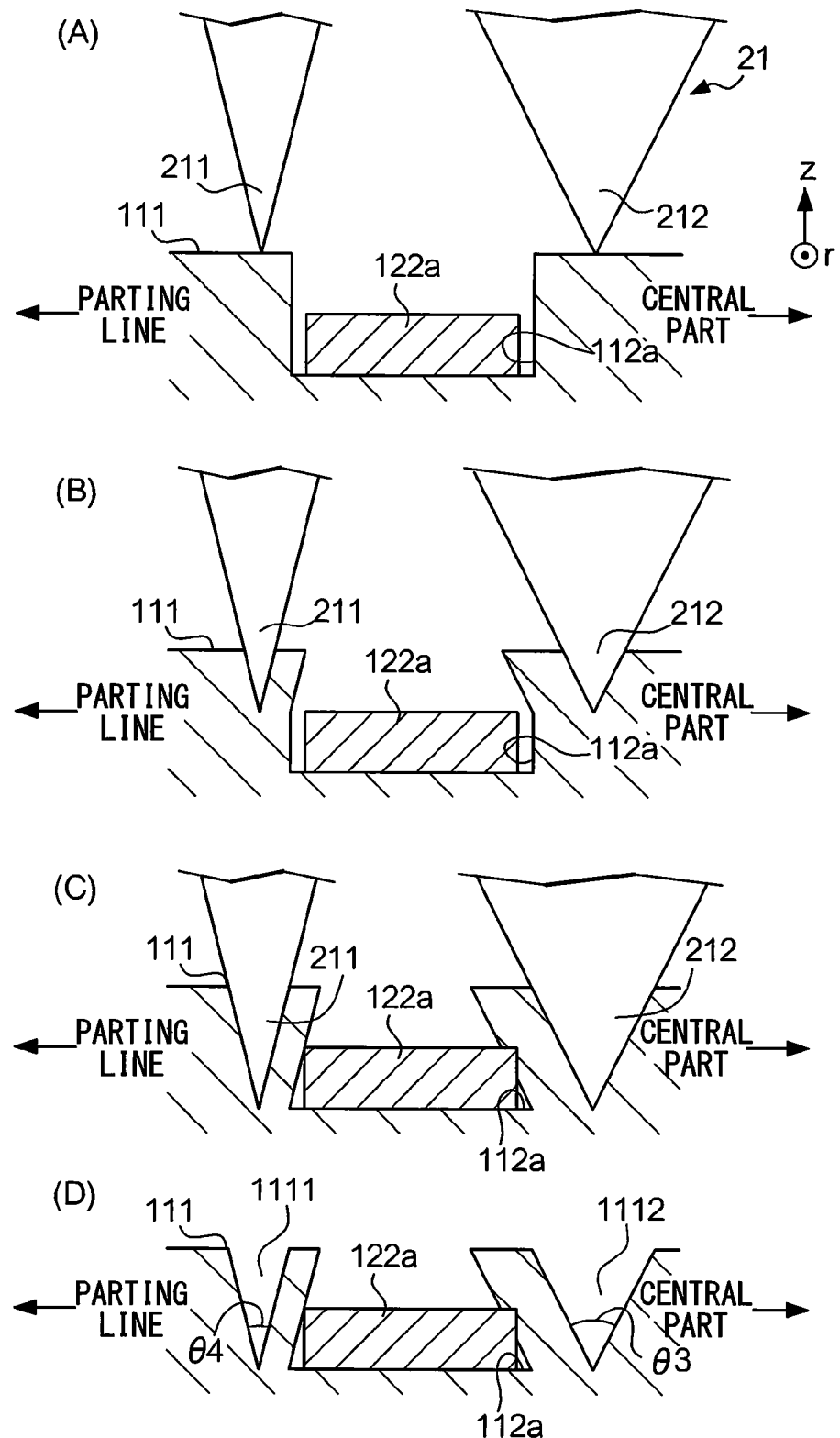
FIG. 8 schematically shows a process of plastic deformation of half bearing member 11 caused by staking.

FIG. 8 schematically shows a process of plastic deformation of half bearing member 11 caused by the staking. Here, a description will be given using an example of staking the periphery of recess 121a using punch 21. Punch 21 moves in the axial direction of the associated shaft, and is positioned on face 111 of half bearing member 11 on one end side. At this time, punching portion 211 is positioned on the outside (the side closer to the parting line) of recess 121a in the circumferential direction, and punching portion 212 is positioned on the inside (the side closer to the central part) in the circumferential direction.

FIG. 8(A) shows a state where punch 21 is in contact with face 111. Since half bearing member 11 and flange member 12 are fitted to each other, projection 122a is present within recess 112a.

Upon pressure in the axial direction being applied to punch 21 in the state shown in FIG. 8(A), half bearing member 11 undergoes plastic deformation, and punch 21 is pushed into half bearing member 11. At this time, a wall face of recess 112a is pushed out toward the inside of the recess due to the volume of punch 21 (FIG. 8(B)).

After punch 21 has been pushed in by a given amount, the staking is complete (FIG. 8(C)). Punch 21 is moved in the opposite direction and is removed. After punch 21 is removed, staking mark 1111 and staking mark 1112 are formed on the respective sides of recess 112a. The angles of the bottom of the staking marks correspond to the shape of punch 21. The angle of staking mark 1111 is smaller (corresponding to θ4), and the angle of staking mark 1112 is larger (corresponding to θ3).

Here, the volume of a deformed portion of a wall face of recess 112a obtained as a result of the staking using punching portion 211 (a left wall face in the diagram) is smaller than the volume of the deformed portion of a wall face of recess 112a obtained as a result of the staking using punching portion 212 (a right wall face in the diagram). That is to say, the force of the deformed wall face pressing recess 122a (staking force) is relatively smaller on the outside in the circumferential direction, and is larger on the inside in the circumferential direction.

Figure 9:
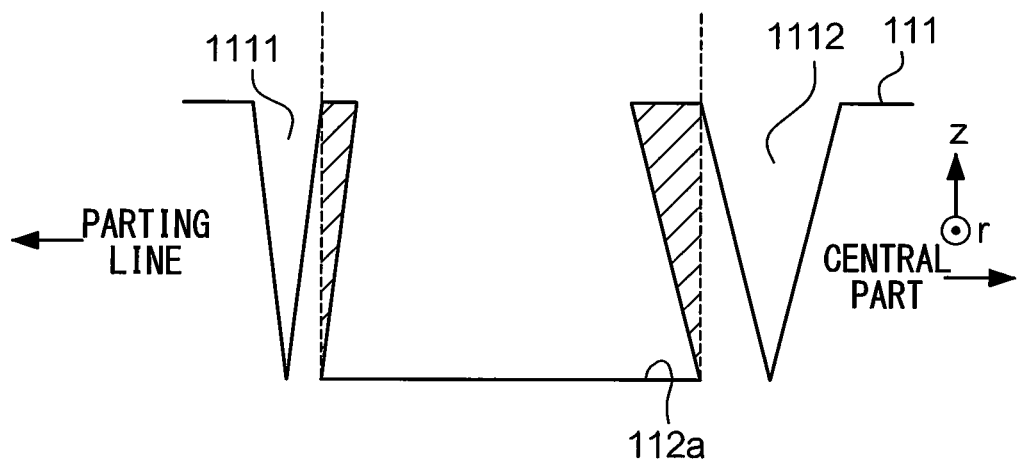
FIG. 9 is an enlarged view of staking mark 1111 and staking mark 1112.

FIG. 9 is an enlarged view of staking mark 1111 and staking mark 1112. Here, projection 122a is omitted. The deformed portions of the wall faces of recess 112a will now be described. For example, portions (hatched in FIG. 9) of recess 112a on the inside of imaginary lines (corresponding to the wall faces of recess 112a before the staking) extending in the axial direction from the bottom of recess 112a can be regarded as the deformed portions obtained as a result of the staking.

Recess 112b and recess 112c are staked using punch 22 and punch 23, respectively. By thus staking recesses 112a to 112c using punches 21 to 23, the staking at two outermost positions in the circumferential direction of a total of six staking positions at the three recesses can be performed more weakly than at the other positions. Note that the same applies to the staking of recesses 114. Note that, in this example, the depths of the staking marks formed on both sides of each single recess 112 are substantially equal.

Figure 10:
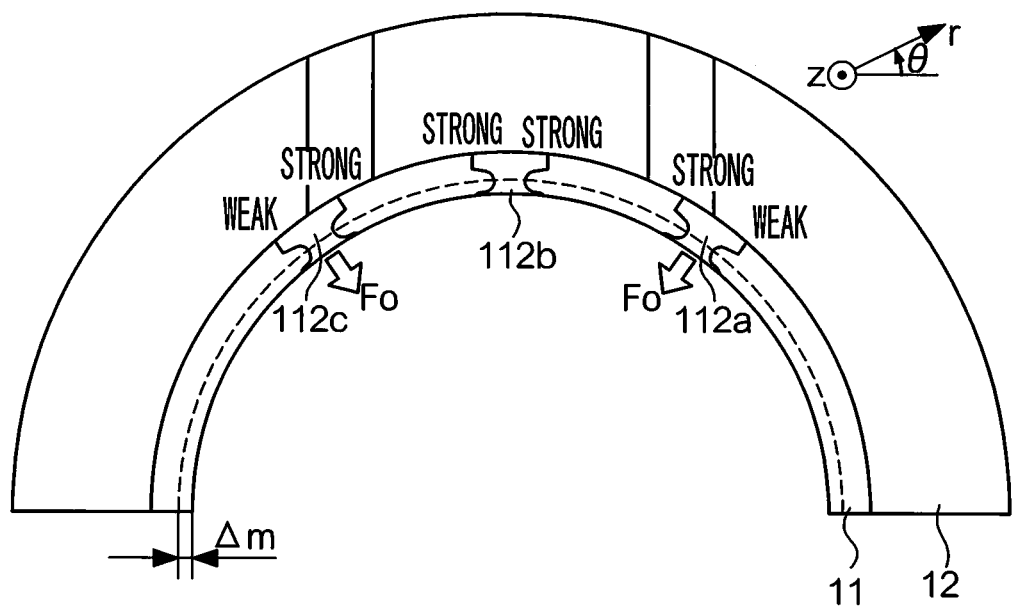
FIG. 10 is a diagram showing a staking force distribution in bearing 10.

FIG. 10 shows a staking force distribution in bearing 10. In this embodiment, the staking force at the two outermost points is smaller than at the other four points, and the four points closer to the central part are staked with a relatively larger staking force, as already described. If these six points are staked with the same force, F0 in the radial direction of bearing 10, i.e. force that reduces the free spread of half bearing member 11 is exerted by, in particular, the staking at the two outermost points. Due to this force, there is a concern that the dimensions of the free spread will become smaller than the designed values thereof. However, in this embodiment, the two outermost points are staked with a relatively small force. Therefore, force F0 is smaller than in the case of staking the six points with the same force, and a reduction in the free spread can be suppressed.

Note that the positions for staking recesses 112 are positions separate from the inner circumferential face of half bearing member 11 in the radial direction by margin Δm. This is for preventing the influence of the deformation due to the staking from being exerted on the sliding face.

Refer to FIG. 2 again. In process S6, bearing 10 is finished. According to this embodiment, a bearing that achieves both ease of assembly to a housing and dimensional accuracy can be obtained.

3. Examples

The inventors of the present application performed experiments to verify the effects of the invention of the present application. The method and the results of the experiment will be described below.

Figure 11:
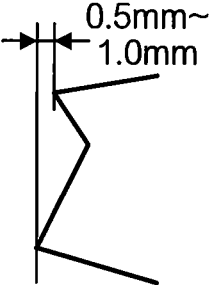
FIG. 11 is a diagram showing experimental conditions.

FIG. 11 shows experimental conditions. Here, two samples shown in experimental examples 1 to 3 were used in the experiment. Bearings having an inner diameter of 64 mm (experimental examples 1 to 3) were used as the samples. The bearings used in the experiment have three recesses in one flange. That is to say, six points were staked in one flange.

In experimental example 1, an offset of 0.5 mm was provided in the distances to the tips of a punch to be used for staking an outermost recess, thereby making the staking force at the two outermost points smaller than at the other four points. The angles of both punching portions were 60°. In experimental example 2, six points were equally staked. The angles of both punching portions were 60°. In experimental example 3, the staking force at the two outermost points were made smaller than at the other four points using the method described in the embodiment. The angles of the respective punching portions were 60° and 45°.

Figure 12:
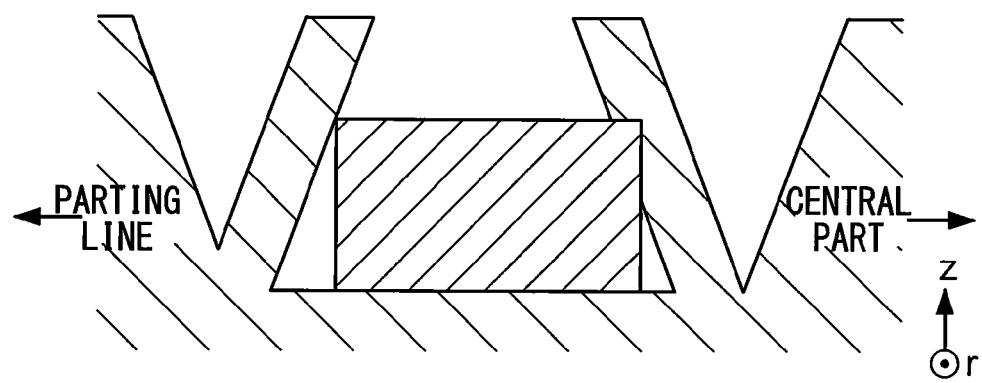
FIG. 12 is a diagram showing external appearances of staking marks in an outermost recess obtained in experimental examples 1 to 3.
Figure 12:
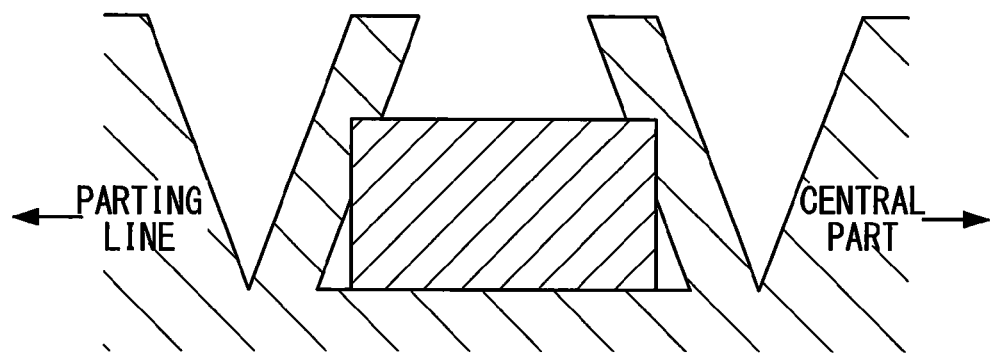
Figure 12:
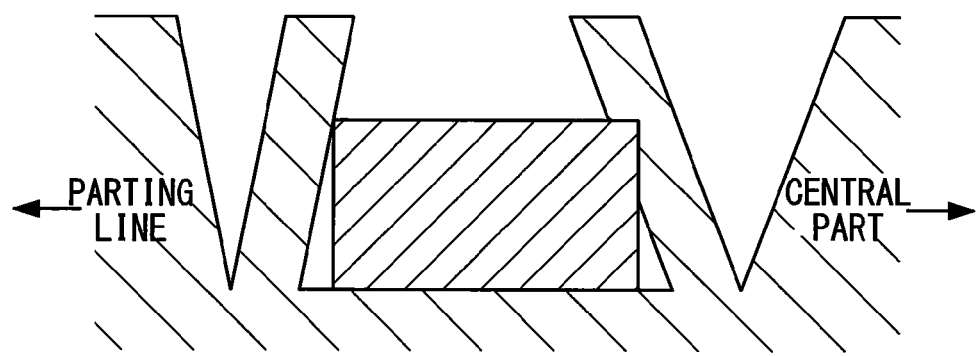

FIG. 12 is a diagram showing external appearances of the staking marks at the outermost recess obtained in experimental examples 1 to 3. FIG. 12 is a diagram schematically showing the external appearances of the staking marks when viewed in the radial direction. In experimental example 1, in a staking mark on the parting line side, the inclination (deformation) of the inner wall of the recess was smaller than on the center side. On the center side, the inner wall of the recess largely inclined to fix projection 122, whereas, on the parting line side, the inner wall of the recess inclined to such a degree that it slightly touched projection 122. In contrast, in experimental examples 2 and 3, the inner walls of the recess inclined on both the parting line side and the center side. That is to say, it is conceivable that, compared with experimental example 1, the capability to hold the flange improved in experimental examples 2 and 3.

Figure 13:
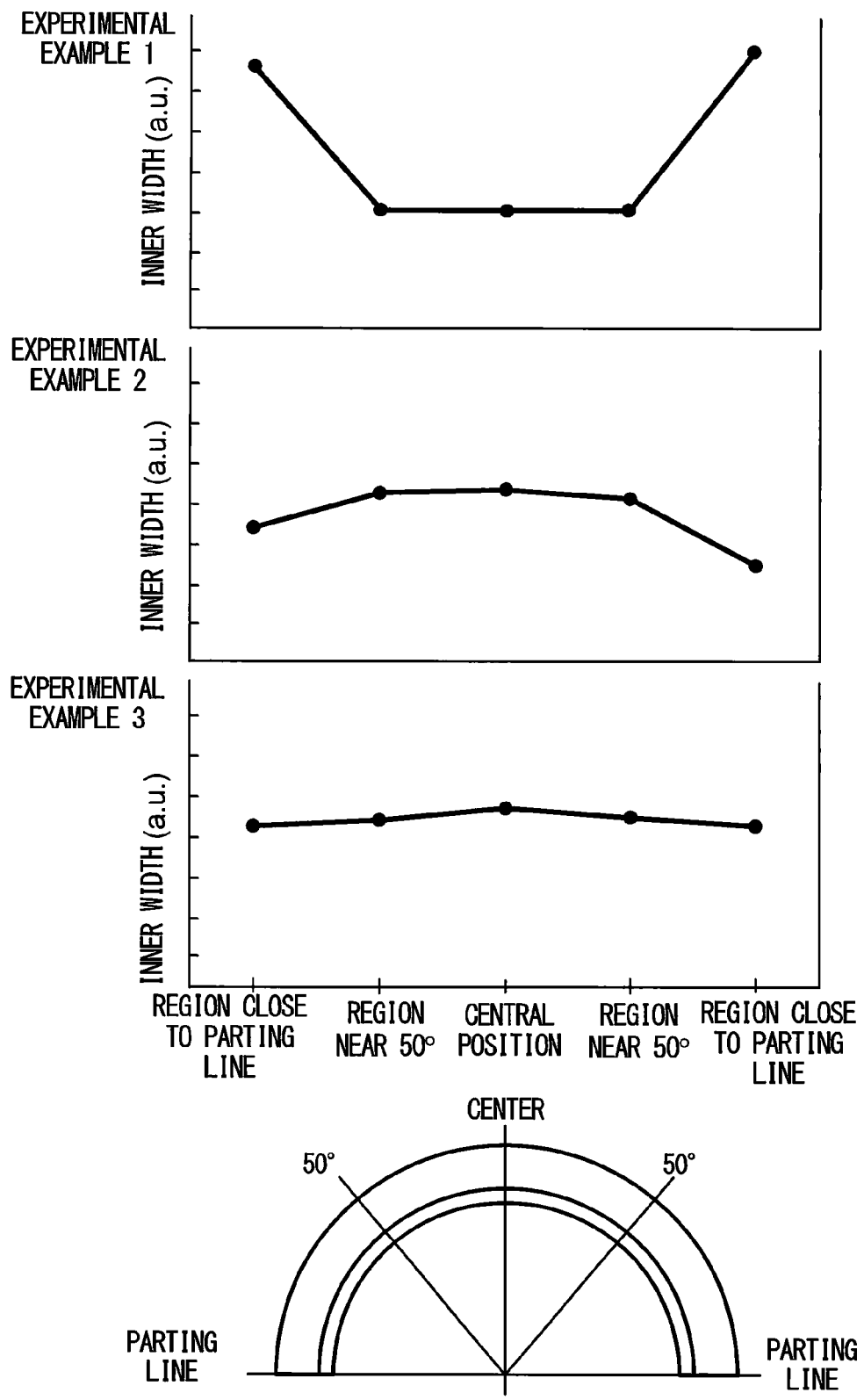
FIG. 13 a diagram showing results of measuring internal widths between flanges in experimental examples 1 to 3.

FIG. 13 is a diagram showing results of measurement of the inner width between the flanges in experimental examples 1 to 3. FIG. 13 shows the results of measuring the inner width between the flanges (in the example in the embodiment, the distance from the back face of flange member 12 (the back face of the thrust face) to the back face of flange member 13) while changing positions, i.e. at positions in regions close to the parting lines, a position in the central part, and positions in parts therebetween (at around) 50°, for example.

In experimental example 1, there was a tendency that the inner width was wider in the regions close to the parting lines than in the central part. In experimental example 2, there was a tendency that the inner width was wider in the regions close to the parting lines than in the central part. In experimental example 3, there was a tendency that the difference in the inner width between the central part and the respective regions close to the parting lines was smaller than in experimental examples 1 and 2.

Note that, although specific measurements were not made here, from the viewpoint of suppressing a dimensional change in the free spread, experimental examples 1 and 3 have the effect of suppressing a dimensional change compared with experimental example 2.

Although FIG. 8 shows an example in which each projection 122 is in contact with the bottom face of corresponding recess 112, a gap may be present between projection 122 and the bottom face of recess 112. The cross-sectional shape of projections 122 is not limited to the rectangle shown as an example in FIG. 8. Other shapes, such as a shape formed by chamfering corners of a rectangle or an arch shape, may be used.

4. Modifications

The present invention is not limited to the above-described embodiment, and various modifications are possible. Some modifications will be described below. Two or more of the following modifications may be combined.

Figure 14:
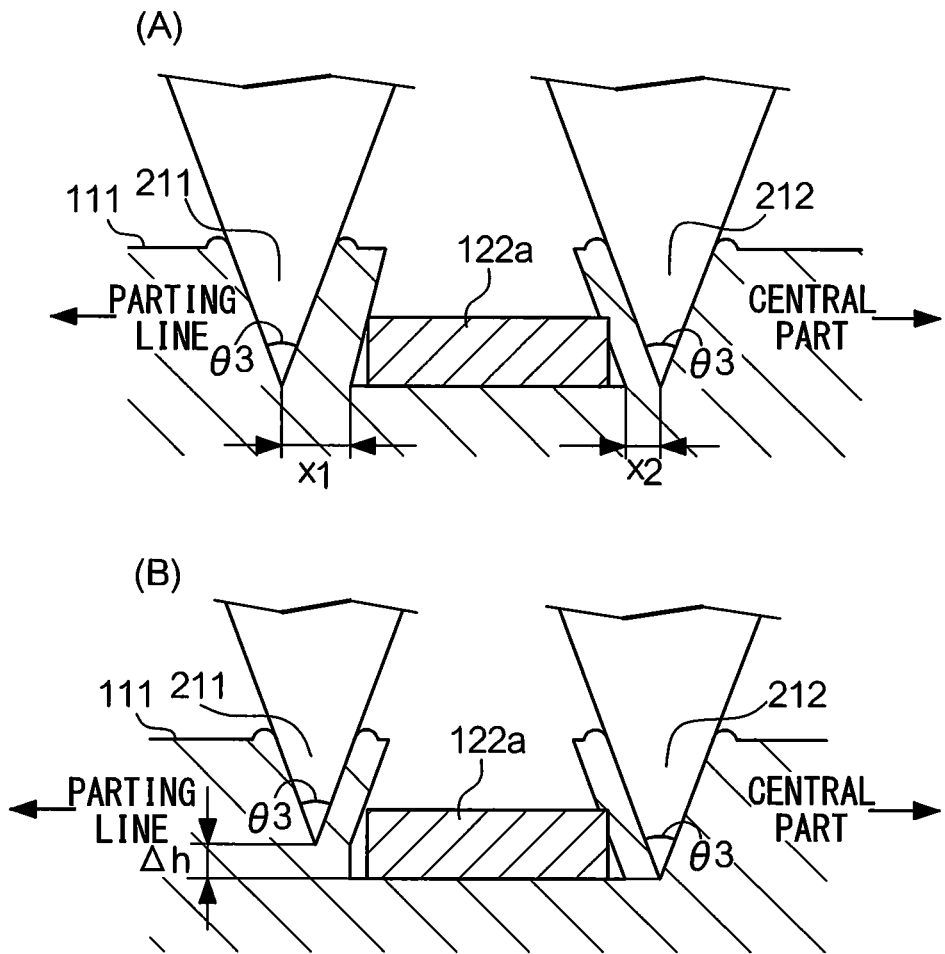
FIG. 14 shows other exemplary staking methods.

FIG. 14 shows other exemplary staking methods. The method for staking recesses 112 is not limited to the method described in the embodiment. In examples in FIGS. 14(A) and 14(B), a punch having punching portions whose tip angles are the same, i.e. θ3, is used.

In the example in FIG. 14(A), an offset from an end of recess 112a is different between the outside (parting line side) and the inside (center side). Specifically, the outer offset is larger, and the inner offset is smaller. The larger offset side is affected by not only the wall face of recess 112a but also the plastic deformation of face 111. However, the amount of deformation of the wall face of recess 112a is smaller; i.e., the staking force is smaller, than with the other staking methods.

FIG. 14(B) shows an example of the punch used in above experimental example 1. In this example, regarding the distance to the tips of punching portions when the punch is in use, the distance to the tip of the punching portion 211 is shorter, and the distance to the tip of punching portion 212 is longer (the difference therebetween is Δh). For this reason, when the punch is pressed in by a given amount, the depths to which the punching portions are pushed are different. The depth on the outside is shallower, and the depth on the inside is deeper. The amount of deformation is smaller; i.e., the staking force is smaller on the side where the sinking depth is shallower. Note that Δh can be set in a range from 0.5 mm to 1.0 mm, for example.

Note that, compared with the example in FIG. 14(B), the amount of contact between the deformed portion and projection 122 increases in the example described in the embodiment and the example in FIG. 11(A), and therefore, the accuracy of the fixing positions of flange member 12 can be improved.

In examples (A) and (B) in FIG. 14, the angles of the tips of the punching portions may be made different.

The shape and the number of the recesses in half bearing member 11, and the shape and the number of the projections in flange member 12 are not limited to those described in the embodiment. Furthermore, the recesses and the projections may not be arranged at equal intervals. The same applies to flange member 13.

The specific shape of bearing 10 is not limited to that described in the embodiment. For example, in the inner circumferential face of half bearing member 11, both side portions on the front face may not be machined, and overlay layer 118 may be formed over the whole face. Half bearing member 11 may have a pawl for positioning, in a region close to either one of the parting lines. Furthermore, flange member 12 and flange member 13 may have a projecting detent for preventing relative rotation with respect to cylinder block B, in their outer circumferential faces. The shape and the number of lubrication grooves 126 are not limited to those described in the embodiment either.

In bearing 10, the flange members (flange member 12 and flange member 13) are fixed to respective ends in the axial direction. However, a flange member may be fixed to only one end.

In this embodiment, two identical bearings 10 are used for supporting one portion of the associated shaft. However, the two bearings used here may have inner circumferential faces (sliding faces) of different shapes, for example. For example, a lubrication groove or a lubrication hole may be provided in one of the upper and lower sliding faces. The usage of bearing 10 is not limited to supporting of crankshaft S.

The invention claimed is:

1. A sliding bearing comprising:
   a half bearing member having an inner circumferential face that slides against an associated shaft, and a plurality of recesses provided in a first end face in an axial direction of the associated shaft;
   a first flange member having a plurality of projections provided at positions corresponding to the plurality of recesses provided in the first end face; and
   a plurality of staking marks formed in a periphery of each recess when each recess is staked in a state where each of the plurality of projections is fitted to a corresponding one of the plurality of recesses in the first end face to fix the first flange member to the half bearing member,
   wherein, when staking marks formed on both sides of at least one of the plurality of recesses are viewed in a radial direction of the associated shaft, a volume of a deformed portion near a staking mark located outside in a circumferential direction is smaller than a volume of a deformed portion close to a staking mark located inside.

2. The sliding bearing according to claim 1, wherein when staking marks formed on both sides of each of two recesses, from among the plurality of recesses, located in outermost parts in the circumferential direction are viewed in the radial direction, an angle of a staking mark located outside in the circumferential direction is smaller than an angle of a staking mark located inside.

3. The sliding bearing according to claim 1, wherein when staking marks formed on both sides of each of two recesses, from among the plurality of recesses, located in outermost parts in the circumferential direction are viewed in the radial direction, a distance between a staking mark located outside in the circumferential direction and a corresponding recess is longer than a distance between a staking mark located inside and the recess.

4. The sliding bearing according to claim 2, wherein the plurality of staking marks have the same depth when viewed in the axial direction.

5. The sliding bearing according to claim 1, wherein when staking marks formed on both sides of each of two recesses, from among the plurality of recesses, located in outermost parts in the circumferential direction are viewed in the radial direction, a depth of a staking mark located outside in the circumferential direction is shallower than a depth of a staking mark located inside.

6. The sliding bearing according to claim 5, wherein the plurality of staking marks have the same angle when viewed in the axial direction.

7. The sliding bearing according to claim 1, further comprising:
   a plurality of recesses provided in a second end face of the half bearing member in the axial direction;
   a second flange member having a plurality of projections provided at positions corresponding to the plurality of recesses provided in the second end face; and
   a plurality of staking marks formed in a periphery of each recess when each recess is staked in a state where each of the plurality of projections is fitted to a corresponding one of the plurality of recesses in the second end face to fix the second flange member to the half bearing member,
   wherein, in each of the first end face and the second end face, when staking marks formed on both sides of at least one of the plurality of recesses are viewed in the radial direction, a volume of a deformed portion close to a staking mark located outside in the circumferential direction is smaller than a volume of a deformed portion close to a staking mark located inside.

8. A method for manufacturing a sliding bearing comprising:
   a process of preparing a half bearing member having an inner circumferential face that slides against an associated shaft, and a plurality of recesses provided in a first end face in an axial direction of the associated shaft;
   a process of preparing a first flange member having a plurality of projections provided at positions corresponding to the plurality of recesses provided in the first end face;
   a process of preparing two punches arranged to have a wider spacing than a width of the recess; and
   a process of, in a state where each of the plurality of projections is fitted to a corresponding one of the plurality of recesses in the first end face, staking at least one of the plurality of recesses such that a volume of a deformed portion close to a staking mark located outside in a circumferential direction of the associated shaft is smaller than a volume of a deformed portion close to a staking mark located inside, and fixing the first flange member to the half bearing member.

* * * * *